(12) United States Patent
Taylor (10) Patent No.: US 8,187,362 B2
(45) Date of Patent: May 29, 2012

(54) APPARATUSES AND METHODS FOR REDUCING POLLUTANTS IN GAS STREAMS

(75) Inventor: Edward O. Taylor, Newark, DE (US)

(73) Assignee: Global Solutions Technology, Inc., Wilmington, DE (US)

( * ) Notice: Subject to any disclaimer, the term of this patent is extended or adjusted under 35 U.S.C. 154(b) by 0 days.

(21) Appl. No.: 13/298,933

(22) Filed: Nov. 17, 2011

(65) Prior Publication Data

US 2012/0061233 A1    Mar. 15, 2012

Related U.S. Application Data

(63) Continuation of application No. 12/879,730, filed on Sep. 10, 2010, now Pat. No. 8,097,072.

(51) Int. Cl.
*B03C 3/014* (2006.01)

(52) U.S. Cl. .............. 95/58; 95/67; 95/69; 95/70; 95/73

(58) Field of Classification Search ................ 95/58, 63, 95/67, 69, 70, 73; 96/55, 57–59, 63, 74, 96/83, 88; 422/186.04
See application file for complete search history.

(56) References Cited

U.S. PATENT DOCUMENTS

| | | | |
|---|---|---|---|
| 3,706,182 A | 12/1972 | Sargent | |
| 3,739,554 A | 6/1973 | Whetten et al. | |
| 3,869,362 A | 3/1975 | Machi et al. | |
| 5,366,701 A | 11/1994 | Taylor et al. | |
| 5,746,984 A | 5/1998 | Hoard | |
| 6,321,531 B1 | 11/2001 | Caren et al. | |
| 6,432,280 B1 | 8/2002 | Bianco et al. | |
| 6,514,315 B1 | 2/2003 | Chang | |
| 6,878,349 B2 | 4/2005 | Bianco et al. | |
| 7,615,107 B2 | 11/2009 | Burlatsky et al. | |
| 8,029,600 B2 * | 10/2011 | Chang | 95/70 |
| 8,097,072 B1 * | 1/2012 | Taylor | 96/55 |

(Continued)

FOREIGN PATENT DOCUMENTS

JP    54-153382 A A    12/1979

OTHER PUBLICATIONS

Chang, J., "Physics and Chemistry of Plasma Pollution Control Technology." Topical invited presentation at 28th International Conference on Phenomena in Ionized Gases (ICPIG), Jul. 15-20, 2007, Prague, Czechoslovakia, pp. 15-18.

(Continued)

*Primary Examiner* — Richard L Chiesa
(74) *Attorney, Agent, or Firm* — Connolly Bove Lodge & Hutz LLP (57) ABSTRACT

Apparatuses and methods for reducing pollutants in a gas stream are disclosed. The gas stream is introduced into a condensation chamber to condense the gas stream. It then proceeds into a first reaction chamber adapted to electrochemically alter the gas stream. From there, the gas stream is directed into a reduction chamber adapted to reduce pollutants and a resonance chamber adapted to ionize the gas stream. The gas stream is then directed into a second reaction chamber adapted to further reduce pollutants in the stream. After treatment, the gas stream may be discharged into the atmosphere or recirculated through the apparatus to further reduce pollutants in the gas stream, the latter providing for a closed-looped system.

12 Claims, 13 Drawing Sheets

U.S. PATENT DOCUMENTS

| | | |
|---|---|---|
| 2002/0069759 A1 | 6/2002 | Allen |
| 2002/0155042 A1 | 10/2002 | Bianco et al. |
| 2003/0202921 A1 | 10/2003 | Kato |
| 2006/0032788 A1 | 2/2006 | Etter |
| 2009/0241775 A1* | 10/2009 | Ogut et al. .................. 95/59 |
| 2010/0074817 A1 | 3/2010 | Kobayashi et al. |

OTHER PUBLICATIONS

Penetrante, B.M. et al., "Comparison of Non-Thermal Plasma Techniques for Abatement of Volatile Organic Compounds and Nitrogen Oxides." Paper presented at Emerging Solutions to VOC & Air Toxics Control Conference, Clearwater Beach, FL, Feb. 28, 1996-Mar. 1, 1996.

"Using Non-Thermal Plasma to Control Air Pollutants," prepared by The Clean Air Technology Center (CATC), US Environmental Protection Agency, Publication No. EPA-456/R-05-001, Feb. 2005.

Chang, J., "Recent development of a plasma pollution control technology: a critical review." *Science and Technology of Advanced Materials* 2 (2001), 571-576.

\* cited by examiner

APPARATUSES AND METHODS FOR REDUCING POLLUTANTS IN GAS STREAMS

PRIORITY

Priority is claimed to U.S. Provisional Patent Application Ser. No. 61/319,539, filed on Mar. 31, 2010 and U.S. patent application Ser. No. 12/879,730, filed on Sep. 10, 2010, now U.S. Pat. No. 8,097,072, the disclosures of which are incorporated herein by reference in their entirety.

FIELD OF THE INVENTION

The present invention relates to apparatuses and methods for reducing pollutants in gas streams, particularly gas streams emitted from combustion processes.

BACKGROUND

Emissions continue to pose numerous problems for the global community. Pollutants in gas streams can cause adverse human health effects and affect global climate change. To protect public health and the environment, environmental agencies around the globe regularly monitor levels of numerous pollutants. In particular, the atmospheric presence of sulfur dioxide ($SO_2$), nitrogen dioxide ($NO_2$), particulate matter (PM), carbon monoxide (CO), volatile organic compounds (VOC), and other toxic pollutants are monitored and evaluated to assure continued health and safety. Some of these pollutants are emitted directly or indirectly into the atmosphere from a variety of sources, including, but not limited to, power plants, factories, waste treatment plants, buses, cars, trucks, airplanes, bulldozers, and commercial and industrial processes. Principally, emissions of carbon dioxide ($CO_2$) from coal-fired power plants create various environmental problems that countries, like the United States, are attempting to obviate due to global warming concerns and continued dependence on coal-fired power plants as energy sources.

Coal-fired power plants and other facilities producing electrical power or steam conventionally burn hydrocarbons in a process that produces substantial emissions of greenhouse gases, particulates, and other toxic air pollutants. In conventional systems, power plant emissions are unavoidable, and emission control systems, devices, and methods typically require multiple, expensive, post-combustion treatment systems that capture $SO_x$, $NO_x$, and other toxic air pollutants. In addition, to date, economical methods for capturing and sequestering $CO_2$ do not exist. Accordingly, power plants continue to contribute significantly to greenhouse gases. The few available methods for combustion treatment of gases reduce the fuel efficiency of power plants, by preventing complete combustion and significantly add to power plant operating costs.

Generally, known devices and methods in the prior art either remove or destroy particles of pollutants before they are emitted into the atmosphere. These devices and methods use mechanical, electrical, and chemical processing means. Examples of such devices include electrostatic precipitators, baghouses, scrubbers, and catalytic converters. While these devices are somewhat effective, each has limitations.

An electrostatic precipitator is a device that removes particles from gas streams using forces associated with induced electrostatic charges. While these devices are known to remove particulate matter, e.g. dust and smoke from gas streams, they generally do not work well in removing carbon particles, such as, for example, carbon particles, resulting from the burning of diesel fuel.

Baghouses are devices used to collect particulates and are generally effective in collecting carbon and fly ash particulates. These devices, however, are prone to moisture, particularly when used in small power plant applications. Excessive moisture can cause the particles to cake within baghouses, preventing proper operation.

Scrubbers are devices that collect particulates and gases. Scrubbers are classified into wet and dry scrubbers. Wet scrubbers either dissolve or absorb particulates using liquids. Polluted particles and gas streams are brought in contact with a scrubbing liquid, e.g. by spraying, such that pollutants are removed. The dissolved pollutants and resulting waste water, however, can form corrosive solutions which thereafter have to be disposed of according to regulatory standards. Dry scrubbers, in contrast, do not saturate gas streams. These devices add absorbent alkaline materials to pollutant gas streams. The alkaline materials react with the gas stream to form a solid byproduct. Both types of scrubbers must be designed considering the properties of the pollution. As a result, scrubbers which are designed to remove $SO_x$ from pollutant-filled gas streams are typically not as effective at reducing $NO_x$ from pollutant-filled gases.

Catalytic converters are devices incorporated into an automobile's exhaust system. These devices reduce the amount of pollutants found in exhaust gases to environmentally harmless levels. A catalytic converter may be placed anywhere in the exhaust system. For optimum efficiency, however, it is necessary to locate a catalytic converter as close as possible to the combustion chamber in an engine compartment. As such, these devices have several limitations.

A pollution control device is also described in U.S. Pat. No. 5,366,701, the disclosure of which is incorporated by reference in its entirety. This device relates to the ionization of a gas stream from a source by passing gas streams through a resonance field. In addition, potentialization and disassociation of molecules that make up the gas stream occurs by passing the stream through a continuous electrical arc. While a significant improvement over the prior art devices described thus far, in practice, this device produces a treated gas released in an excited state at an elevated temperature, such that post-processing of the treated gas is still required.

Due to the limitations described and others known in the art, the pollution control industry is still in need of apparatuses and methods that overcome these and other limitations. In particular, there is still a need for apparatuses, and methods that do not create hazardous pollutant byproducts. There is also a need for cost-effective apparatuses, and methods that do not consume high amounts of energy. There is a further need for apparatuses adaptable for retro-fit with existing sources of pollution, particularly those sources that emit gas streams from combustion processes.

While certain aspects of prior art pollution control devices have been discussed, technical aspects of these devices are in no way disclaimed and it is contemplated that the claimed invention may encompass one or more technical aspects of the prior art devices discussed herein.

SUMMARY OF THE INVENTION

The present invention is directed toward apparatuses and methods for reducing pollutants in gas streams. Certain embodiments of the apparatuses of the present invention, as well as its method of use, reduce pollutants such as hydrocarbons, nitrous oxides, carbon monoxide, particulates (e.g. carbon particulates in soot), and offensive odors from gas streams.

As used herein, the term "pollutants" is broadly defined to include any undesirable matter in a gas stream. Pollutants within the scope of the invention are therefore not limited to toxic substances and can include, for example, targeted processing byproducts or filtered substances that, when reduced, have a beneficial effect on the gas stream. Whether the effect is beneficial is based upon considerations in the various industries where the apparatuses, systems, and methods of embodiments of the invention are applied.

Embodiments of the invention can be used to reduce pollutants from many different sources. Pollutants can be contained in gas streams emitted from internal combustion engines such as, but not limited to, those in cars, trucks, buses, boats and trains. Pollutants can also be emitted from sources other than combustion engines, such as, but not limited to, incinerators; restaurant and bakery stove exhaust; dry cleaning exhaust; automotive repair and paint shop exhaust; sewage treatment plant exhaust; exhaust from power generating stations; and exhaust from manufacturing facilities.

Embodiments of the invention include systems, apparatuses, and methods variously used to:
 efficiently and effectively reduce pollutants in gas streams;
 efficiently and effectively reduce the amounts of particulates in gas streams, e.g. nitrogen oxide species ($NO_x$), carbon monoxide (CO), carbon dioxide ($CO_2$), volatile organic compounds (VOC) and sulfur oxide species ($SO_x$);
 efficiently and effectively remove and/or destroy particulates, including NOx, CO, $CO_2$, VOC and $SO_x$, such that the requirements of environmental agencies including, but not limited to, the Environmental Protection Agency are met or exceeded.
 reduce pollutants in gas streams such that treated gas streams can be recycled for reuse; and
 recycle waste and control emissions of engines, and other effluent gas sources, while meeting energy efficiency requirements and increasing engine efficiency.

It is contemplated that the present invention may address limitations in a number of technical areas, as well as the limitations of the prior art discussed above. Therefore, the claimed invention should not necessarily be construed as limited to any of the particular limitations discussed herein.

A first embodiment, an apparatus for reducing pollutants in a gas stream, includes an inlet for an effluent gas having pollutants, several fluidically coupled chambers, and an outlet for the treated gas. The fluidically coupled chambers include: a condensation chamber adapted to condense the gas stream, a first reaction chamber adapted to electrochemically alter the gas stream, a reduction chamber adapted to reduce pollutants from the gas stream, a resonance chamber adapted to ionize the gas stream, and a second reaction chamber.

A second embodiment, a method for reducing pollutants in a gas stream, comprises: condensing the gas stream in a condensation chamber; electrochemically altering the gas stream in at least two reaction chambers; reducing pollutants in the gas stream in a reduction chamber; and ionizing the gas stream in a resonance chamber.

DETAILED DESCRIPTION

Overview of Scientific Principles

For background purposes, the present invention applies, in part, three principles of physics: plasma physics, resonance, and the waveguide concept. Applying these principles in combination with combustion thermodynamics enables the systems, apparatuses and methods disclosed herein to electrochemically alter pollutant gas streams to produce a purified gas stream. Moreover, the application of these principles employs means of stabilization, disassociation, and condensation, such that embodiments of the present invention can electrochemically alter pollutant gas streams.

Plasma Physics

Plasma physics is a field of physics which relates to the study of highly ionized gases. Plasma is a gaseous state of matter, composed of a nearly equal number of positive and negative free charges (positive ions and electrons), where atoms or molecules are broken apart such that ions are formed. Because plasma is composed of charged particles, it exhibits many phenomena not encountered in ordinary gases.

The charged particles of plasma are each surrounded by a Coulomb's field; and it is through this field that the particles interact with each other. Microscopically, these electrostatic fields give rise to localized attractive or repulsive forces between the particles as they pass near each other, resulting in mutual neutralization. Plasma also reacts as a conducting fluid to the total electromagnetic field in which it is immersed.

A plasma field will break the bonds of a gas in an orderly and manageable equilibrium, enabling usage of the energy potential in a target gas by recombination. Pollutants, as well, can be clipped from the gas exhaust of engines, turbines, boilers, machines, etc., and recombined to make other products, destroyed or released as harmless natural elements to the environment. In one application of these principles, non-thermal plasma can be used to generate gas phase free radicals which are used to destroy pollutants in gas streams.

Resonance

The principle of resonance is applicable to the resonance chambers and subsystems herein described. In one application, a particle moving along a horizontal axis is said to exhibit simple harmonic motion when the displacement for equilibrium, X, varies in time according to the following relationship: $X=A \cos(wt+\delta)$, where A, w and $\delta$ are constants, and t is time. In order to give physical significance to these constants, it is convenient to plot X, where A=amplitude of motion, i.e. the maximum displacement of the particle in either positive or negative X direction; W=an angular frequency; $\delta$ (the constant angle)=a phase constant or phase angle, where $\delta$, along with A, is determined by the initial displacement and velocity of the particle. Resonance fields can be created applying these principles by various means, including, exposing pollutant gas streams to alternating currents, physical vibration, sound, light, or other means of oscillation.

Wave Guide Concept

A discussion of the concept and science of the use of waveguides, large circuits and random wave output is also useful in understanding the principles employed by the present invention.

The sinusoidal wave is a time-varying current associated with circuits as a modern integration with a number of closed loop filaments (ideally resistanceless conductors) connecting various combinations of generated or induced voltage with the passive elements—resistors, capacitors, and inductors. There are two classes of time varying sinusoidal currents, repetitive and non-repetitive. Repetitive sinusoidal current can be defined as having a cyclic function that has a time of reoccurrence ($f=1/T$), the frequency in which a sinusoidal wave completes one hold cycle in the period $f=1/T$.

By mixing homogeneous waves, harmonic frequencies are achieved. These frequencies are then used to disassociate hydrocarbon chemicals. Further, harmonic non-homogeneous current propagates random wave output. To assure maximum coverage and minimum collection attraction potential, one of the effects, bipolarization, is achieved in polarizing orientation of the non-homogeneous environment of non-specific wave generation. The automatic release of both negative and positive species of an airborne mass will experience bipolarization in a piezoelectric field, specifically a crystalline dielectrical waveguide. The electric circuit employed within the scope of the present invention is largely associated with the production of waves that are generally boundaryless. Applying the aforementioned principles, and in particular the wave guide concept, allows for the electrochemical alteration of pollutant gas streams.

Apparatus

Figure 1:
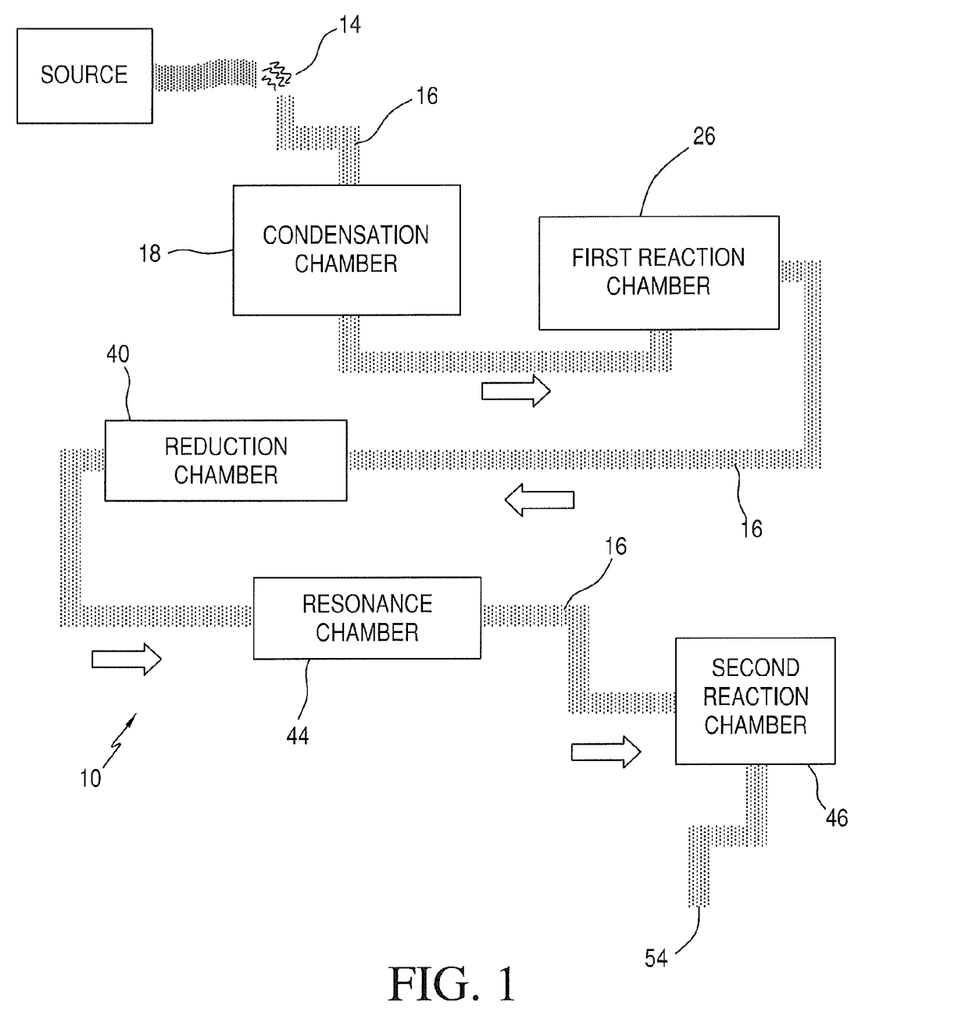
FIG. 1 is a schematic diagram of an apparatus for reducing pollutants in a gas stream.

Turning to the drawings, FIG. 1 illustrates schematically an apparatus 10, known in one commercial embodiment as the GST™ 3000, for reducing pollutants in a gas stream. The arrows shown illustrate the direction of the flow of the gas stream 12. The direction shown and the position of the elements of the apparatus, however, are not to be construed as limiting. Elements of the apparatus may be arranged in any way that allows for a desired level of reduction of pollutants in the gas stream. The apparatus includes an inlet 14 for a gas stream, several fluidically coupled chambers, as described below, and an outlet 54 for the treated gas. The transport of the gas stream through the apparatus is achieved by negative pressure suction.

In certain embodiments of the invention, the gas stream travels from a source through the apparatus at a rate of approximately 8.6 ft/sec such that the approximate travel time for the gas stream is approximately 27.4 seconds. Alternatively, the outlet gas stream may be fluidically coupled to recirculate the gas stream back into the apparatus, providing for a closed-looped system that will run in excess of 30 hours. Equipment or sources appropriate for use with the apparatus include: steel industry processing equipment, plating system equipment, soil remediation equipment, battery backup systems, vehicles systems, maintenance facilities exhaust systems, landfill processing equipment, and waste removal systems.

The apparatus has an inlet 14 for the gas stream 12. The inlet 14 may be piping, tubing, funnels, or other types of openings proving for fluid communication. Also, the apparatus may include an inlet port (not shown) which allows the gas stream to flow without significant resistance. The inlet port may optionally use electronic valves actuated by logic circuitry, e.g. a programmable logic controller ("PLC"). These types of valves allow portions of the gas stream to flow to other apparatuses, if required for a particular application.

Each chamber of the apparatus is fluidically coupled using piping 16. The piping 16 preferably is made from Polyvinyl Chloride (PVC), however, any suitable material may be employed. The material, however, should provide for sufficient sulfur exchange with the gas stream 12. The piping may optionally be adapted as heat exchangers.

Figure 2:
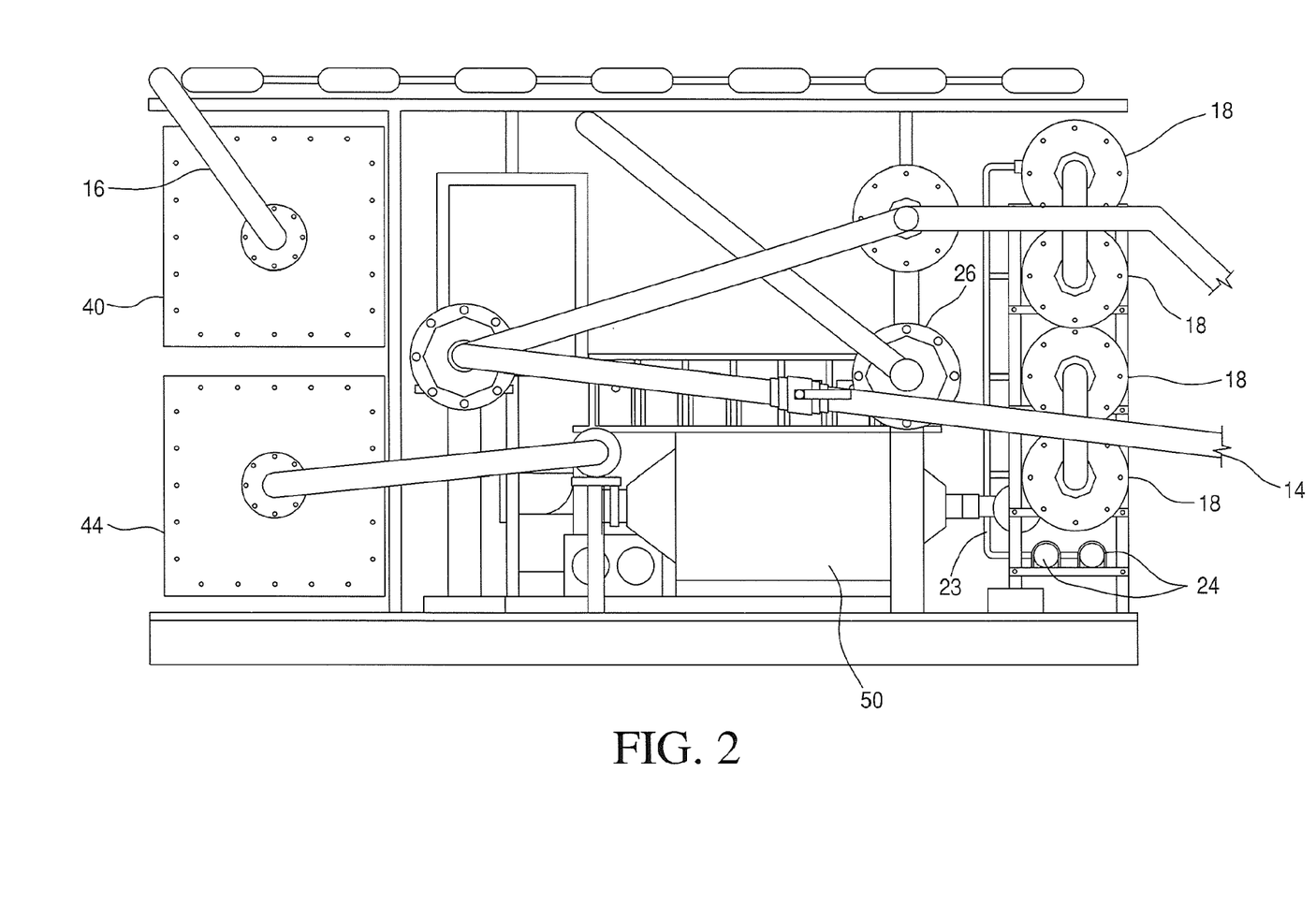
FIG. 2 is a front elevational view of an apparatus for reducing pollutants in a gas stream.
Figure 3:
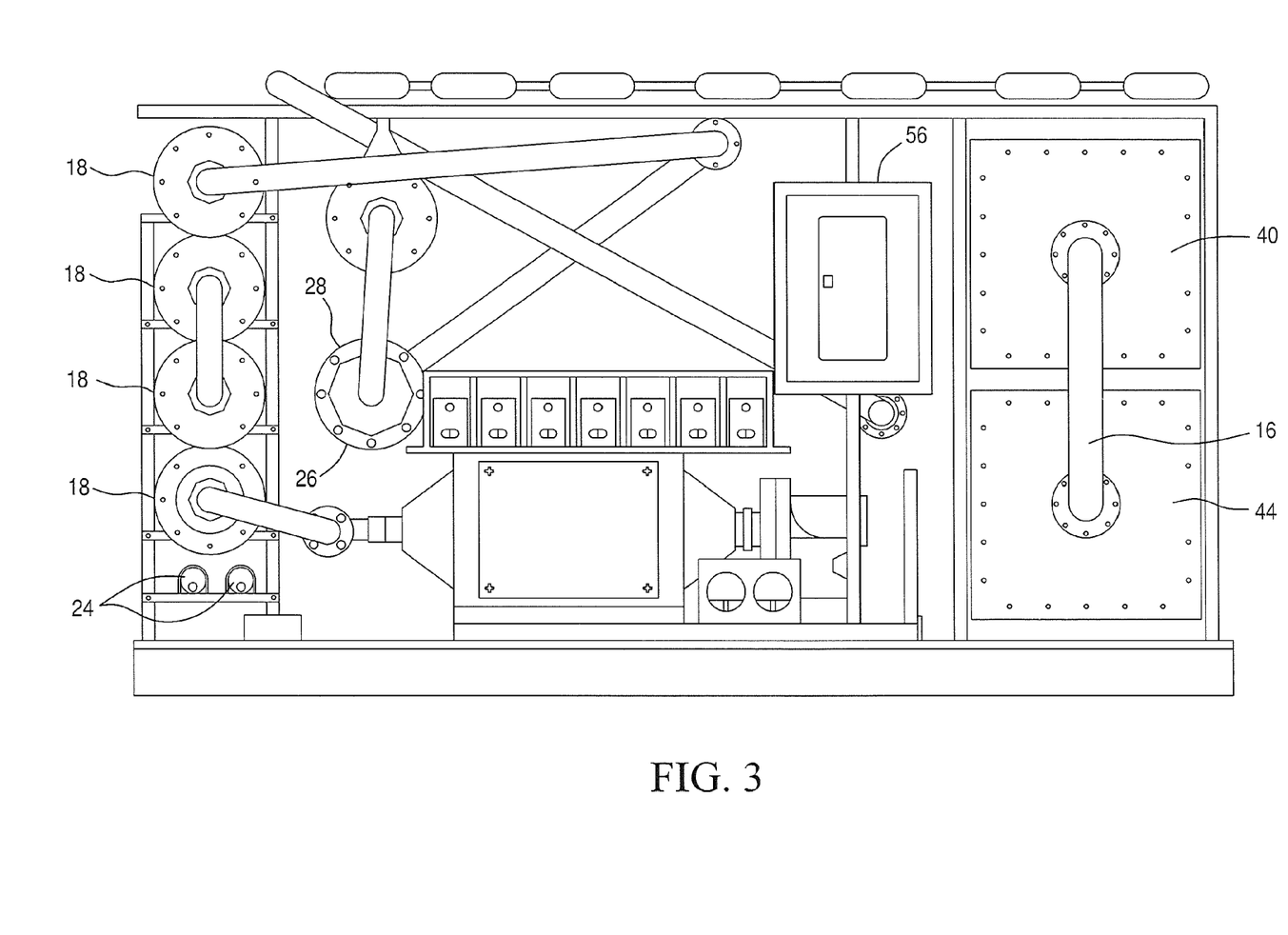
FIG. 3 is a rear elevational view of the apparatus shown in FIG. 2.
Figure 4:
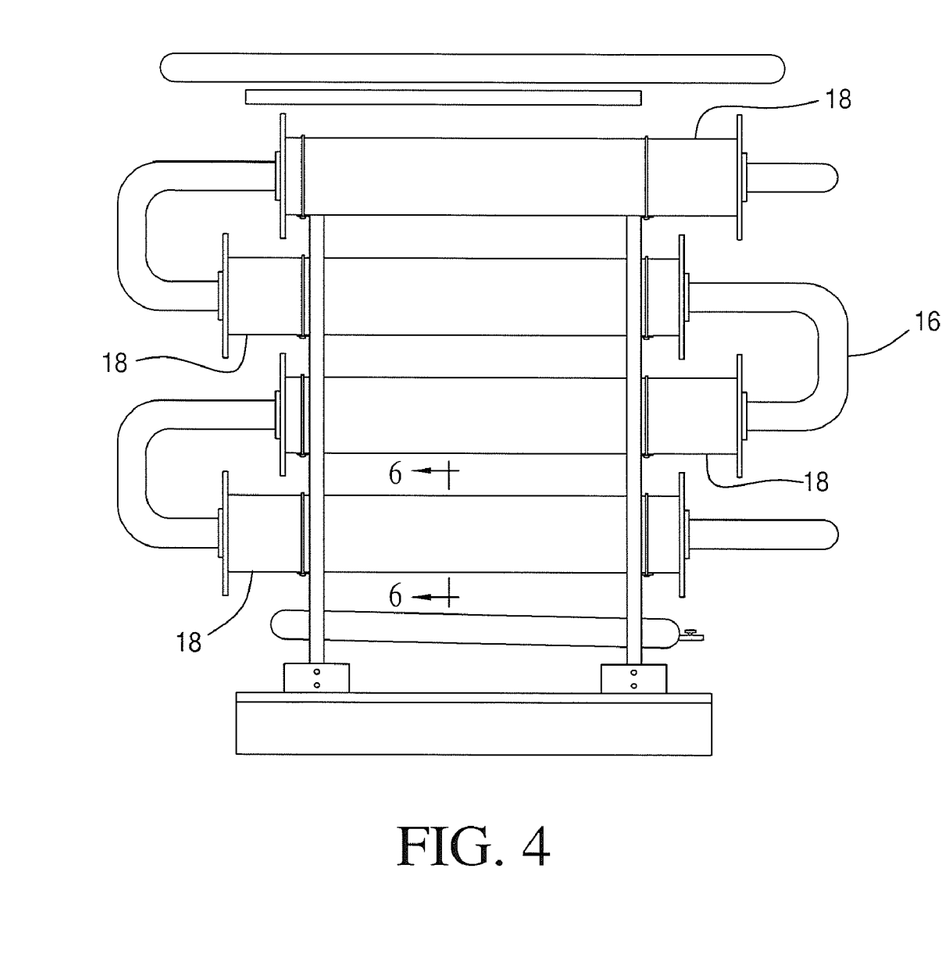
FIG. 4 is a left side view of the apparatus shown in FIG. 2.
Figure 5:
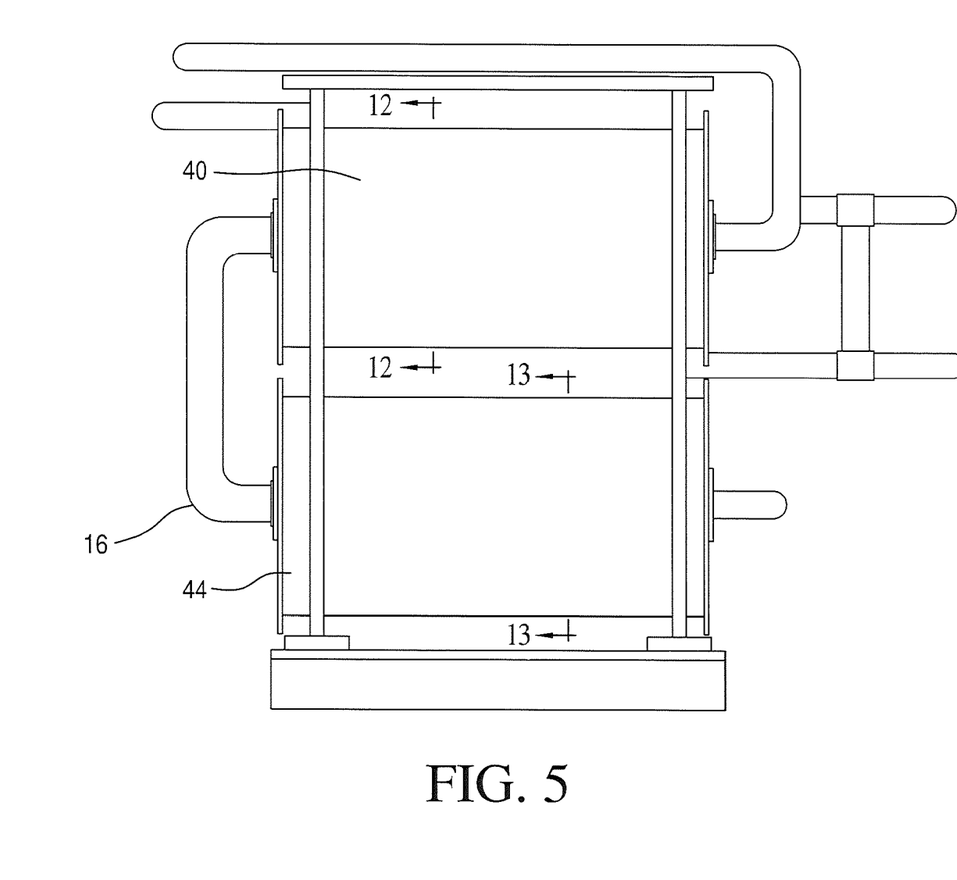
FIG. 5 is a right side view of the apparatus shown in FIG. 2.
Figure 6:
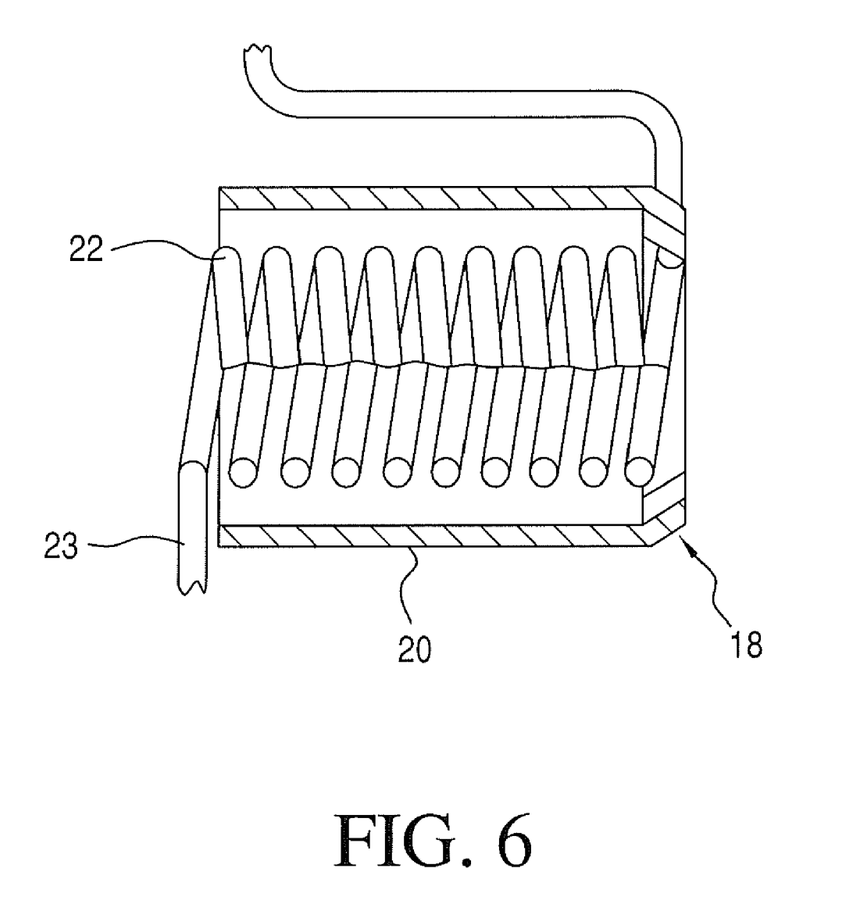
FIG. 6 is a cross-sectional view taken along line 6-6 of a condensation chamber.
Figure 7A:
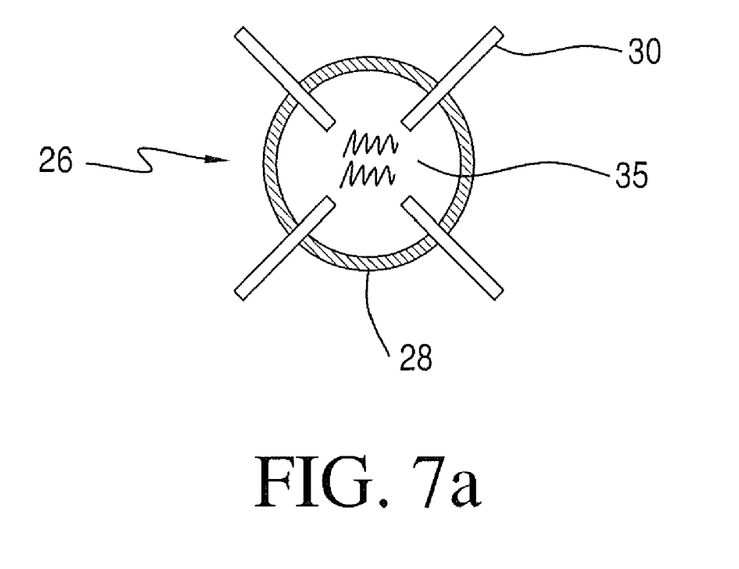
FIGS. 7a and 7b are representations of cross-sectional views of a reaction chamber, schematically illustrating the positioning of collar assemblies.
Figure 7B:
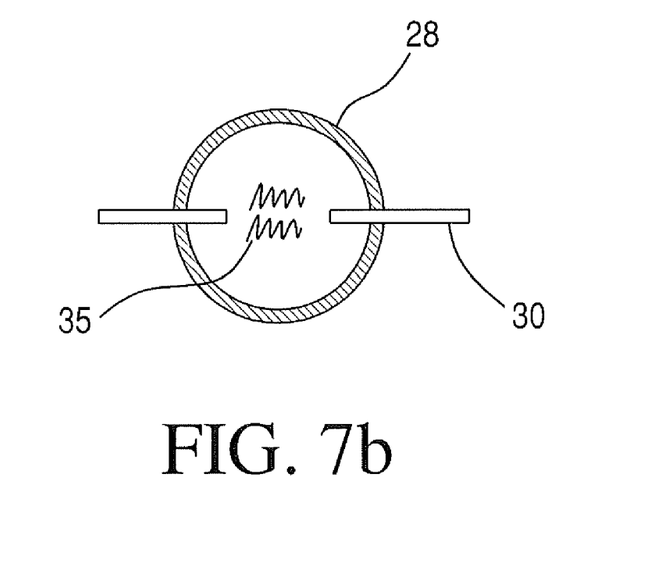
Figure 8A:
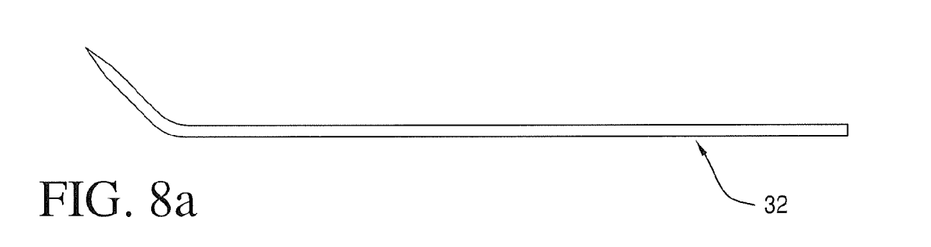
FIG. 8a is a side view of a probe.
Figure 8B:
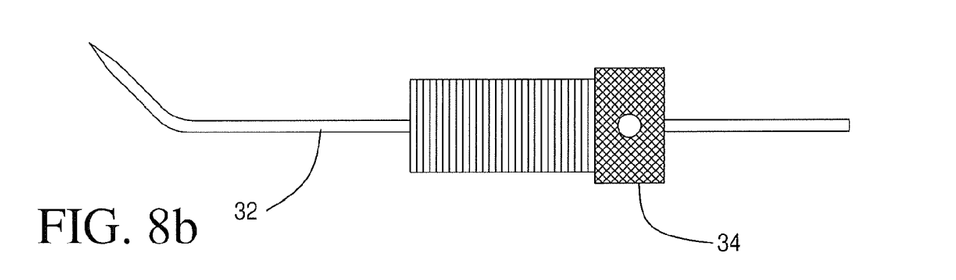
FIG. 8b is a side view of a probe and a probe holder.
Figure 8C:
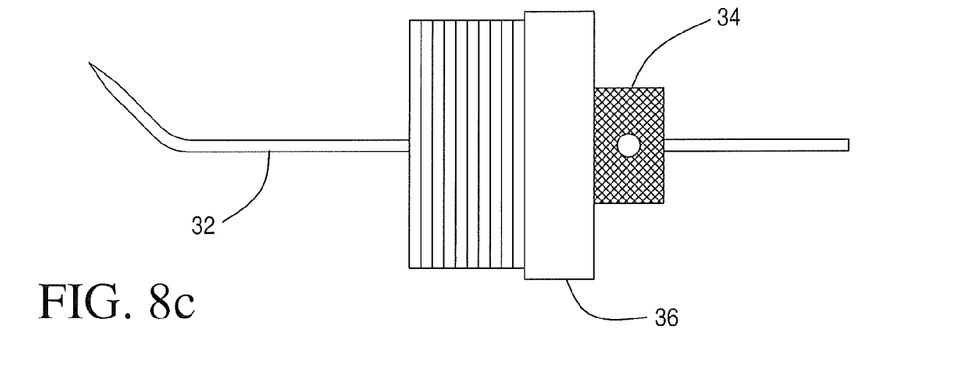
FIG. 8c is side view of a probe, a probe holder, and a resistor.
Figure 8D:
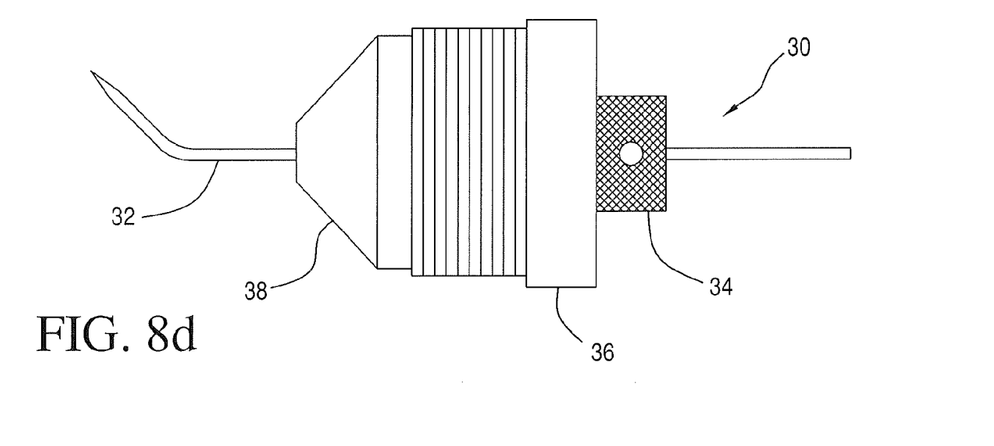
FIG. 8d is a side view of a collar assembly.
Figure 9A:
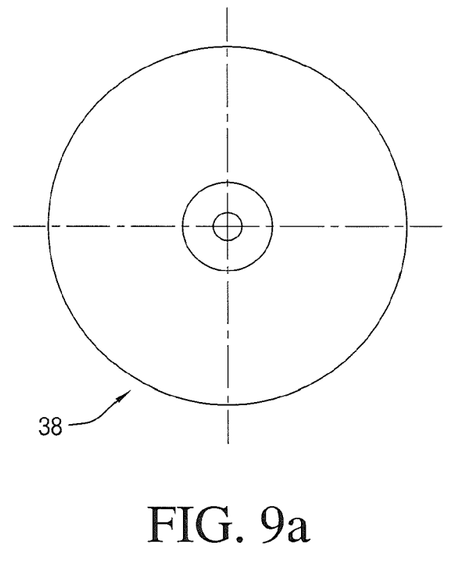
FIG. 9a is a left side view of a collar.
Figure 9B:
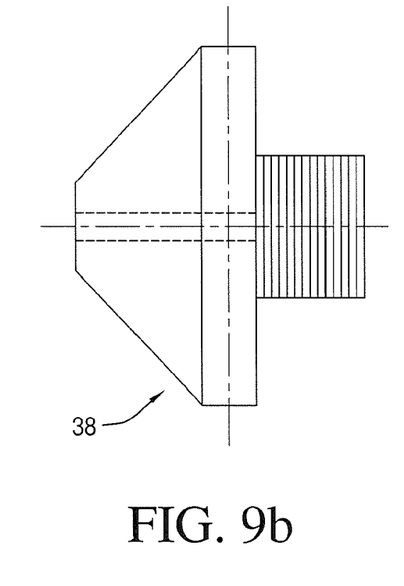
FIG. 9b is a front view of a collar.
Figure 9C:
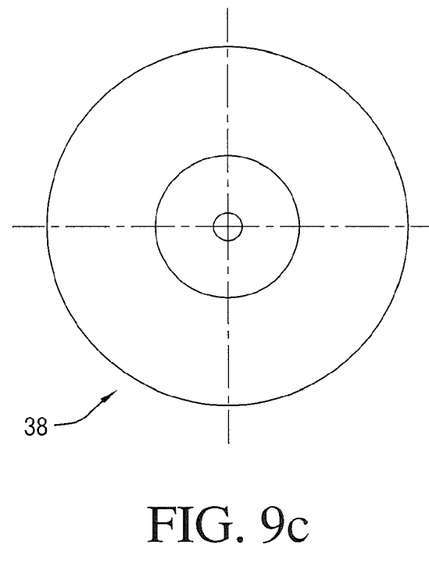
FIG. 9c is a right side view of a collar.
Figure 10A:
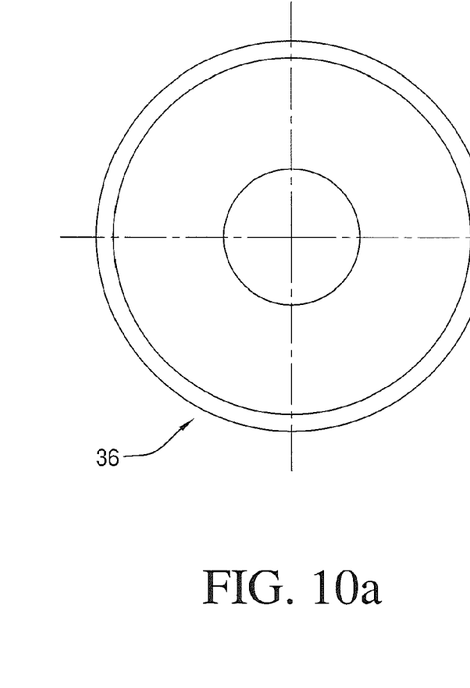
FIG. 10a is a left side view of a resistor.
Figure 10B:
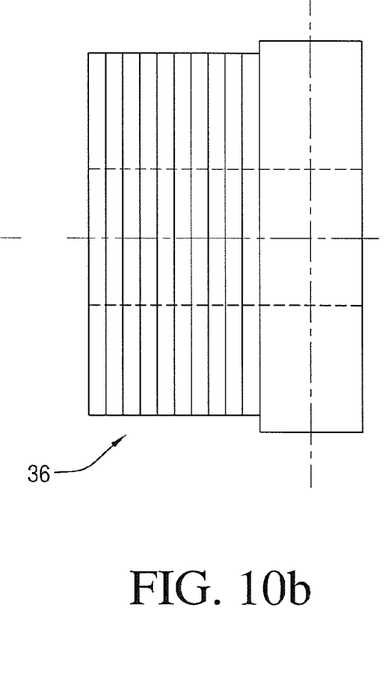
FIG. 10b is a front view of a resistor.
Figure 10C:
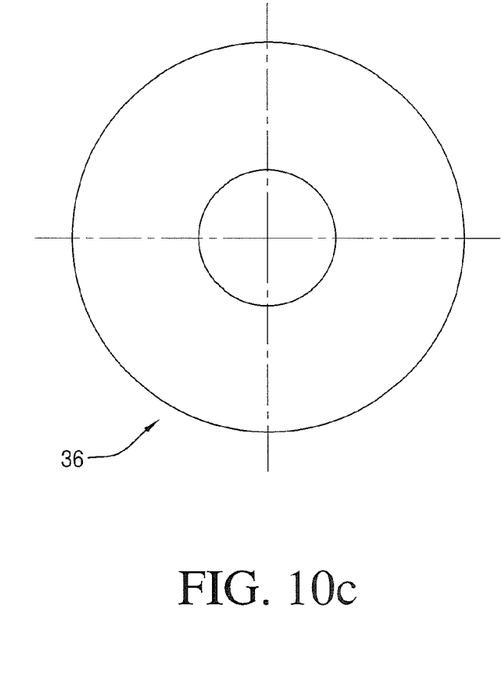
FIG. 10c is a right side view of a resistor.
Figure 11A:
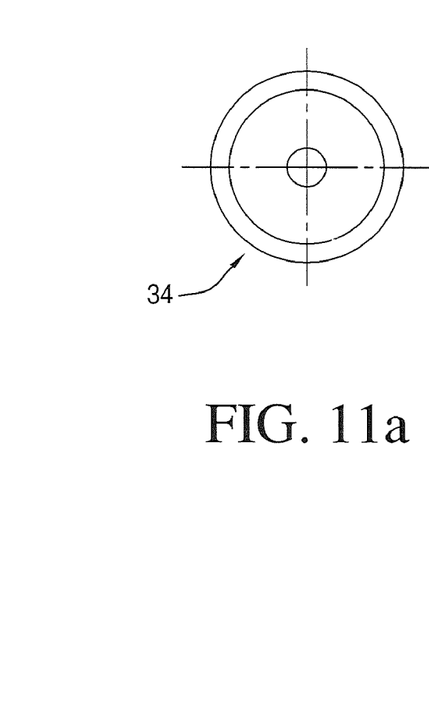
FIG. 11a is a left side view of a probe holder.
Figure 11B:
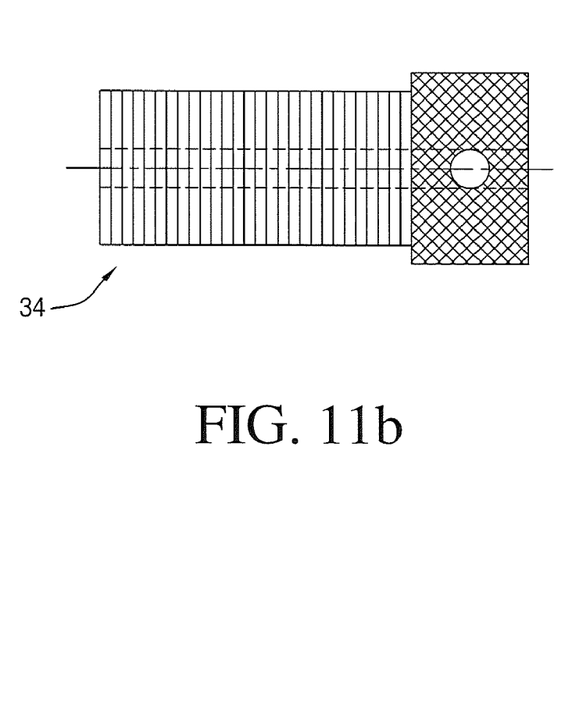
FIG. 11b is a front view of a probe holder.
Figure 11C:
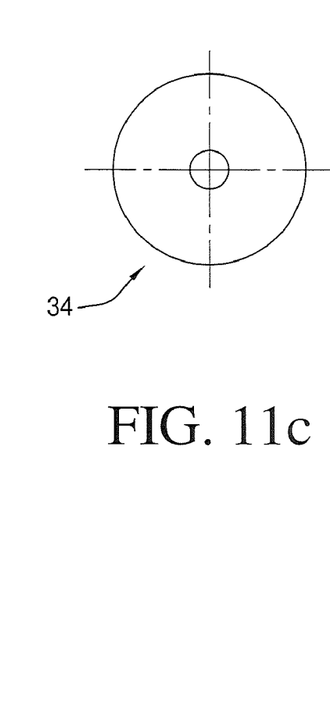
FIG. 11c is a right side view of a probe holder.

In one embodiment, the inlet 14 is fluidically coupled to a plurality of condensation chambers 18 which are adapted to condense the gas stream and gradually decrease its temperature, pressure, and velocity. In one configuration, as shown in FIGS. 2-4, one or more condensation chambers may be positioned before or after the first reaction chamber discussed below. The condensation chamber 18 comprises a housing 20 that is thermally conductive, chemically resistant, lightweight, and easily fabricated. In addition, the material is suitable for high inlet gas temperatures of 500° F. or higher. Examples of such housing materials include high temperature aluminum alloys. These types of materials are suitable for any of the respective chambers discussed herein. Contained within the housing is cooling coil 22. The coil may be any type of corrosion resistant tubing, including plastics, stainless steel, copper tubing, etc. A coolant from a coolant source (not shown) is transported through the coils to condense the gas stream 12. Various types of coolants may be used, as long as they are not corrosive to the cooling coil.

Coupled to the condensation chambers 18 is tubing 23 that transports condensate from the chambers to receptacles 24. The receptacles 24 collect condensate formed in the condensation chambers 18. Preferably, the tubing 23 is vertically connected to the plurality of condensation chambers and the receptacles are positioned near the base of the apparatus.

Optionally, the apparatus is fluidically coupled to an expansion chamber (not shown) that includes baffle plates (not shown) with drilled holes for allowing the gas to flow through the baffle. Baffles can reduce the flow of the gas stream and provide for additional flow control. These baffles may also be controlled by the PLC. The reduction in temperature of the gas stream accomplished by an expansion chamber will help to stabilize the gas stream. Exemplary baffles may be formed from stainless steel and/or may be lined with a non-magnetic material. The removal of pollutants in the expansion chamber can further enable other chambers within the apparatus to target pollutants like $NO_x$ and $SO_x$ that could make up the gas stream.

Where the expansion chambers are not utilized, the gas stream 12 flows from the condensation chambers 18 to a first reaction chamber 26. This reaction chamber 26 comprises a reaction chamber body 28 preferably made from a material that is conductive, highly resistant to chemicals, and capable of withstanding high temperature environments. The body has openings 29 that are adapted to receive novel collar assemblies, as described below.

The reaction chamber will electrochemically change the state of matter of the gas stream to a plasma, thereby destroying undesirable pollutants. Plasma may be generated by a number of methods, including electrical fields, electron beams, and irradiation with electromagnetic energy of appropriate intensity and wavelength such as those disclosed in "Recent Development of Plasma Pollution Control technology: A Critical Review," authored by Jen-Shih Change, the entirety of which is incorporated herein by reference.

In a preferable configuration, however, the first reaction chamber 26 is configured as an arc plasma reactor where the creation of a plasma arc is created, using, in part, novel collar assemblies 30. In this configuration, the first reaction chamber 26 is fitted with eight collar assemblies. Each collar assembly 30 is disposed through openings 31 radially positioned in the body 27 of the reaction chamber 26. Further, each collar assembly comprises a probe 32, a probe holder 34, a resistor 36, and a collar 38. The collar 30 is made from a non-conductive material and is alternatively referred to a probe attenuator. Suitable materials for the collar include Electrical Grade Virgin Polytetrafluorethylene (PTFE). The collar material must be highly electrically resistant such that the collar assembly can withstand 60,000 volts or more. In one configuration, eight collar assemblies are used although a lesser or greater number of collar assemblies may be used, depending on the application and the concentration of pollutants contained in the gas stream. The collars 38 are preferably threaded for attachment within the chamber; however, any other means of attachment may be used.

Attached to the collars 38 are probes 32 and probe holders 34 which both act as electrodes. Preferably, these components are made from conductive materials like steel, and more preferably chemically resistant conductive materials like stainless steel. The probes are disposed within a through-hole 33 in the probe holder and coupled to the holder with a set screw. For the first reaction chamber, a portion of the probe, approximately 0.625 inches is bent to form a probe tip 37, angled at 45°. To generate a suitable arc, the paired probe tips have a space between the tips of about 0.50 to 0.75 inches. The probe holders 34 are optionally threaded to facilitate attachment to the collars 38; however, other means of attachment are possible. The collar assemblies 30 are preferably placed equidistant around the reaction chamber body 28 at specific angles, 45° apart for example.

The probes 32, preferably with a 5 mm diametrical cross-section, are used to produce an electromagnetic field through the generation of a plasma arc 35. The orientation of the probe holders 34 also affects the effectiveness of the first reaction chamber 26 in electrochemically altering the gas stream 12. Preferably, a clock orientation for the collar assemblies is utilized, using at least eight collar assemblies. Four of the families are positioned in through-holes in the reaction chamber body. The collar assemblies may be located, for example, at the 12 o'clock, 3 o'clock, 6o'clock, and 9 o'clock positions. Another set of four collar assemblies are positioned in the reaction chamber body at a specified distance and angularly offset from the first set of assemblies by preferably 45 degrees. However, depending on the composition of the gas stream, and specifically the energy to mass density ratio within the first reaction chamber, additional probe holders may be utilized. Also, suitable resistors 36 are capable of withstanding temperatures up to 500° F. Preferably, the resistors are made from a nonconductive material such as PVC.

The first reaction chamber 26 is electrically coupled to an AC or DC pulsed electrical power source (not shown) for generation of plasma within the chamber, using high voltage wiring. The power and frequency requirements may, however, depend upon the quantity and/or density of the pollutants in the gas stream. Also for safety reasons, it is preferable to attach an insulator (not shown) to each probe that extends from the reaction chamber body. Suitable insulator materials include latex. All components requiring electrical coupling are connected to a control box 56.

Figure 12:
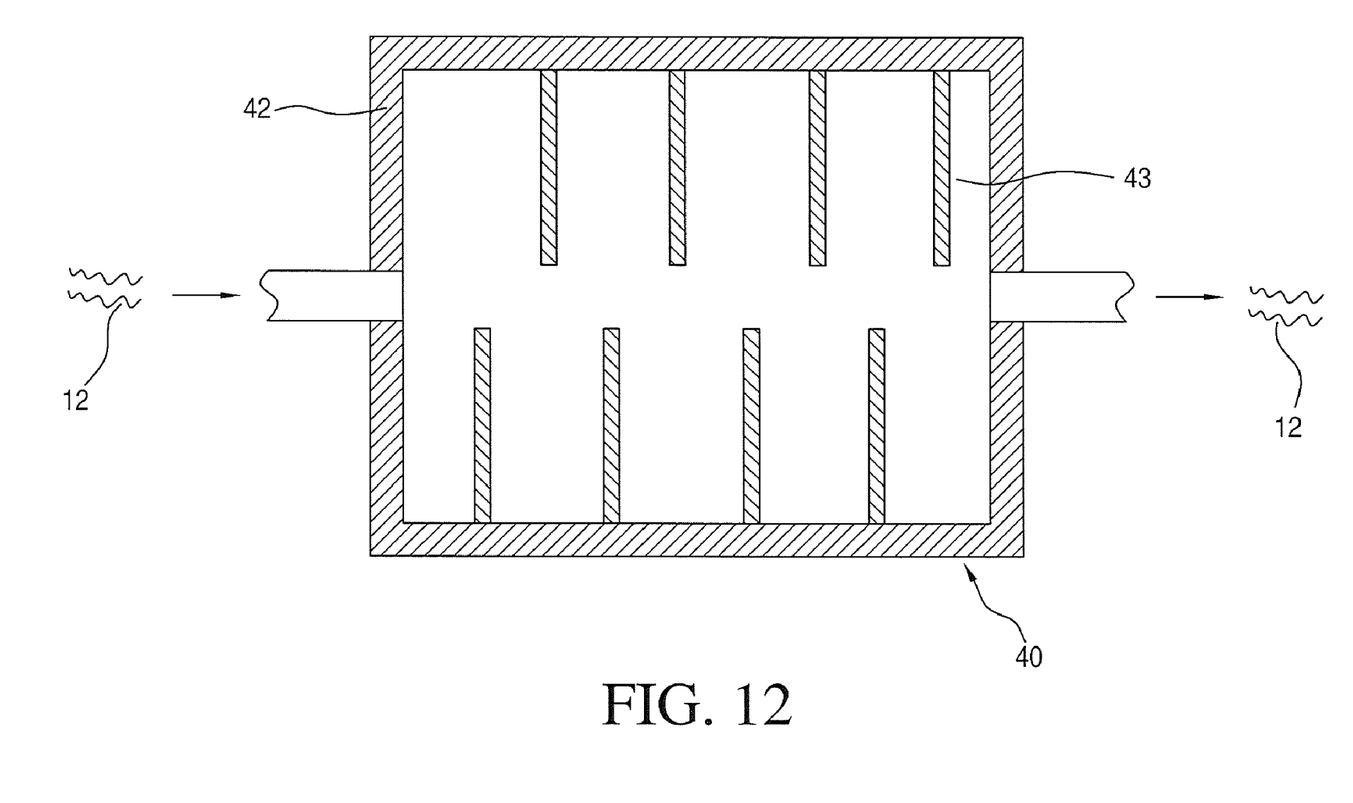
FIG. 12 is a cross-sectional view of a reduction chamber taken along line 12-12.

From the first reaction chamber 26, the gas stream 12 flows into a reduction chamber 40 and then to a resonance chamber 44. The reduction chamber 40, shown in FIG. 12, is adapted to absorb particulates in the gas stream 12. The reduction chamber has an outer body 42 that is preferably made from steel; however, any material that can withstand the temperature of the gas stream 12 at this stage in the apparatus is suitable. Contained within the reduction chamber is a cellulose material 43, preferably an absorbent wood, containing natural lubricants. Pine is most preferable. The cellulose material is positioned within the outer body 42 such that flow of the gas stream 12 is optimized. In one configuration, boards of pine are attached to the top and bottom of the outer body 42, using high temperature adhesives or mechanical methods of attachment.

Figure 13:
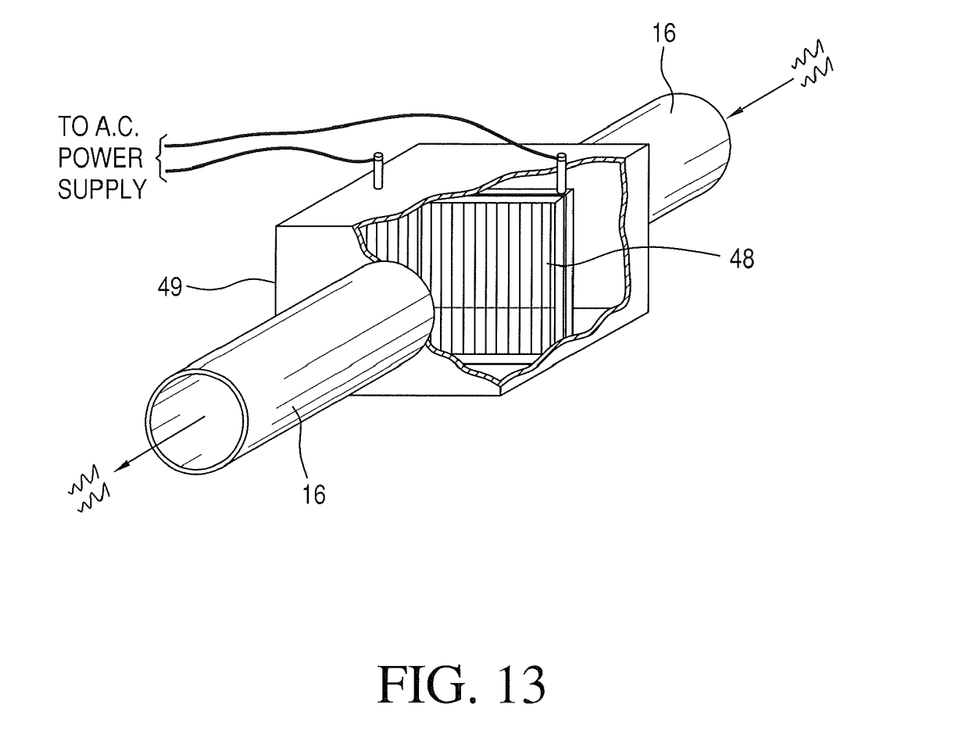
FIG. 13 is a cutaway view of a resonance chamber.

From the reduction chamber, the gas stream 12 flows through a resonance chamber 44, shown in FIG. 13. The chamber comprises a body 49 and a wire grid 48. Alternatively the chamber 44 can house one or more resonating coils (not shown). Within the resonance chamber 44, the gas stream 12 is ionized by an established resonance field before flowing to a second reaction chamber 46 discussed below. Extreme ionization potential allows for disassociation of the respective molecules of the gas stream. The resonance chamber 44 is optionally configured to collect heavy oxides, hydrocarbons, ash, and dust, among other contaminants. In certain embodiments, the gas stream 12 passes through a wire grid 48. The wire grid is taken from a Honeywell F50 Electric Air Cleaner Cells, using 136434AA coil, or other comparable systems. The gas stream 12 is subjected to an electric field that is generated by alternating current that passes through the grid. The current is supplied from a power source (not shown).

Preferably, as an alternative to the wire grid, one or more modified Honeywell FC37A1130 Electronic Air Cleaner Cells are disposed within the resonance chamber. The access door of the cell is removed and replaced with an aluminum panel. The aluminum panel is configured to increase ionic distribution within the resonance chamber. The aluminum plate is preferably disposed over the circuit plate of the air cleaner cell.

The power source of the resonance chamber 44 may alternatively be an AC or a DC power supply. The power source can be pulsed on a three phase system for canceling grounds, allowing the air cleaner cells to run wet or dry without sparking or arcing. Optionally, an AC or DC pulsed supply may also be used to generate plasma in the reaction chambers to facilitate disassociation and destruction of pollutants within the gas stream.

Additionally, other high powered, high frequency components may be used to target pollutants, including heavy metals and VOCs. Moreover, lower power, lower frequency components may be used to target pollutants, including $NO_x$ and $SO_x$. Both collection and dissociation may be further accomplished where multi-chambered resonance chambers and/or a plurality of resonance chambers are included within the apparatus.

From the resonance chamber 44 the gas stream flows to the second reaction chamber 46 through piping 16. Operatively, the second reaction chamber 46 is substantially similar to the first reaction chamber. The configuration of this second resonance chamber, however, may be the same as or different than the first reaction chamber. In one embodiment, for example, the probes tips are straight rather than angled and two collar assemblies used are positioned at 3 o'clock and 9 o'clock.

The apparatus 10 may also include a cooling unit (not shown) which utilizes a refrigerant such as ammonia, carbon dioxide, ethane, ethylene, glycol, methane, nitrogen, propane, or propylene.

Additionally, a blower unit 50 may be used for controlling the gaseous flow of the gas stream through the apparatus. The blower unit 50 may be, for example, an enclosed variable speed fan assembly or a damper, or other means for regulating gaseous flow. The flow of the gas stream 12 may also be regulated by the blower unit 50 relative to the measured the level of pollutants in the polluted gas stream. If the percentage of undesired pollutants is relatively high, then the dwell time of the gas stream within the apparatus may be increased. Conversely, if the percentage of undesired pollutants is relatively low, then the flow velocity of the gas stream may be increased, reducing the dwell time of the gas stream. Preferably, this feature may be utilized to control the residence time of the gas stream in the reaction chambers of the apparatus. The blower unit is preferably controlled by logic circuitry that is responsive to pollutant levels in the gas stream.

Other exemplary embodiments may include further components which help condition the gas stream 12 and reduce pollutants in the gas stream before flow into either the first reaction chamber or the second reaction chamber.

After the gas stream 12 flows through the components described above, a treated gas stream 52 is produced. The gas stream 52 can either enter into the atmosphere through an outlet 54 or optionally be directed for recirculation into the apparatus. By re-circulating the treated gas stream 52 emissions are substantially limited.

EXAMPLES

Examples were carried out using EPA certified labs. The labs used specific testing protocol designed to operate with ionic charged gas stream. One principal factor when conducting this testing is that ionic charged gases do not recombine. Rather, these gases seek like pairs. The industry, however, is processing emission gases to a ground state, thus leaving the discharged gas stream vulnerable to recombination with the atmosphere.

Embodiments of the present invention typically have gas stream flow with an abundance of active molecules in a normal charged state. The charged pairs, which are losing and gaining electrons, react normally when released into the environment. Thus, the first example was intended to run the apparatus in a closed-loop such that the treated outlet gas was recirculated into the apparatus. The results of a first example demonstrated operation of the apparatus in a closed-loop mode in excess of 30 hours. The apparatus was coupled to a 50 KW Diesel Generator, 75 hp, 285 cfm.

Other examples were conducted to assess the levels of Nitrogen Dioxide, employing NIOSH 6014 methods, as published in the National Institute for Occupational Safety and Health ("NIOSH") Manual of Analytical Methods, Fourth Edition.

In this test, the apparatus of the present invention was connected to the exhaust flow of a diesel engine. The exhaust flow (Inlet) from the diesel engine was analyzed to determine a base line for testing. The treated exhaust stream was then analyzed after passing through the invention (Outlet). Typical inlet temperatures of diesel engine exhaust is in the range of 300° to about 500° F. Outlet gas stream temperatures are in the range of 97° to 103° F. In this example, the resonance chamber used a plurality of Honeywell F50 Electric Air Cleaner Cells.

|  |  | (µg) | (mg/m³) | ppm |
|---|---|---|---|---|
| Inlet | Nitrogen Dioxide | 610 | 100 | 54 |
| Outlet | Nitrogen Dioxide | 170 | 29 | 15 |

Accordingly, apparatuses and methods for reducing pollutants in gas streams, particularly gas streams emitted from combustion processes, are disclosed.

Although embodiments and applications of this invention have been shown, it would be apparent to those skilled in the art that many more modifications are possible without departing from the inventive concepts herein. The invention, therefore, is not to be restricted except in the spirit of the appended claims.

What is claimed is:

1. A method for reducing pollutants in a gas stream comprising:
   destroying pollutants in the gas stream in at least one reaction chamber having a collar assembly, disposed partially within the reaction chamber, the collar assembly comprising, a collar and a probe holder adapted to receive a probe;
   condensing the gas stream in a condensation chamber;
   ionizing the gas stream in a resonance chamber; and
   absorbing pollutants in the gas stream in a reduction chamber.

2. The method of claim 1, wherein the reaction chamber is coupled to plating system equipment.

3. The method of claim 1, wherein the reaction chamber is coupled to soil remediation equipment.

4. The method of claim 1, wherein the reaction chamber is coupled to battery backup systems.

5. The method of claim 1, wherein the reaction chamber is coupled to at least one vehicle.

6. The method of claim 1, wherein the reaction chamber is coupled to maintenance facilities exhaust systems.

7. The method of claim 1, wherein the reaction chamber is coupled to landfill processing equipment.

8. The method of claim 1, wherein the reaction chamber is coupled to waste removal systems.

9. The method of claim 1, wherein the reaction chamber is coupled to a device generating exhaust.

10. The method of claim 1, wherein the reaction chamber further comprises a body having an inlet and an outlet, wherein the inlet is adapted to receive the gas stream and the outlet is adapted to transmit the gas stream.

11. The method of claim 1, wherein the reaction chamber is an arc plasma reactor.

12. The method of claim 1, further comprising creating a plasma arc within the reaction chamber.

* * * * *